May 2, 1961     O. W. DILLON     2,982,061
LENS BLOCKING APPARATUS
Filed March 17, 1960     2 Sheets-Sheet 1
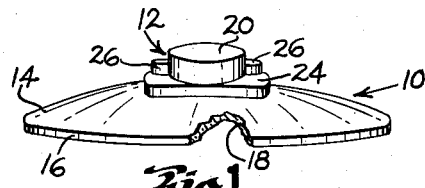
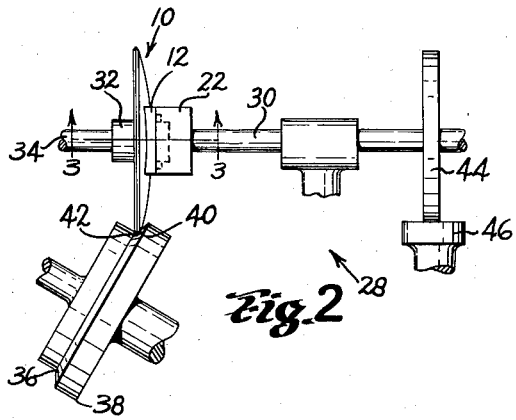
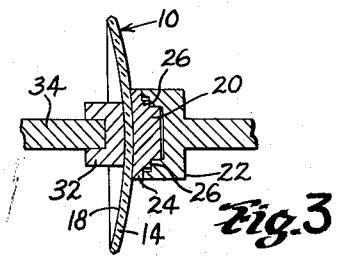
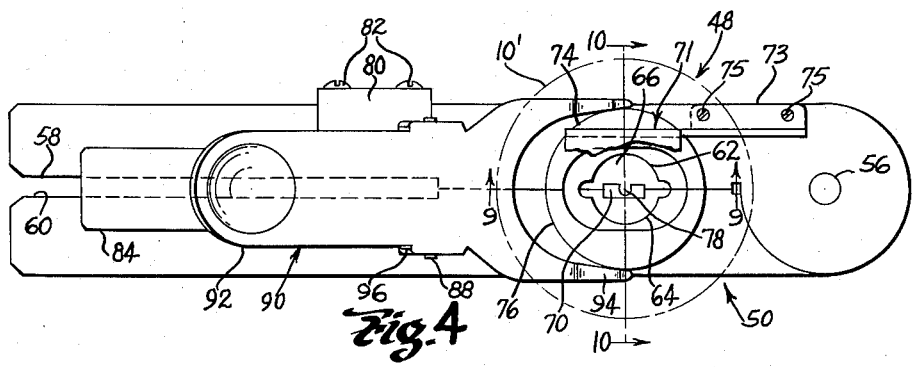
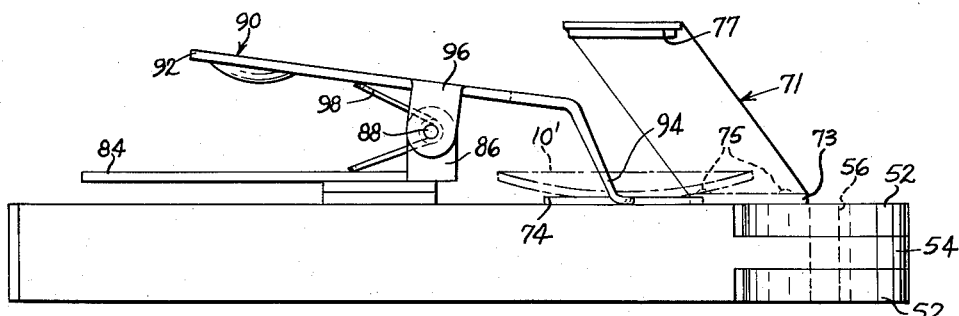
INVENTOR
OSCAR W. DILLON
BY James P. M. Hudson
Louis R. Gagnon
ATTORNEYS May 2, 1961  O. W. DILLON  2,982,061
LENS BLOCKING APPARATUS
Filed March 17, 1960  2 Sheets-Sheet 2

INVENTOR
OSCAR W. DILLON
BY James M. Andrew
Louis L. Gagnon
ATTORNEYS

United States Patent Office 2,982,061
Patented May 2, 1961

2,982,061
LENS BLOCKING APPARATUS
Oscar W. Dillon, Sturbridge, Mass., assignor to American Optical Company, Southbridge, Mass., a voluntary association of Massachusetts
Filed Mar. 17, 1960, Ser. No. 15,742
6 Claims. (Cl. 51—277)

The field of this invention is that of supporting blocks for articles which are to be subjected to various manufacturing operations, and the invention relates more particularly to apparatus for blocking a lens blank for supporting the blank during finishing operations thereon.

In blocking an article such as a lens blank for supporting the blank during performance of blank manufacturing or finishing operations, the block must be accurately formed to be centered on machines used in lens manufacture, the optical axes of the blank must be carefully located relative to the block, and the blank must be securely mounted on the block. In the past it was customary to mount a lens blank upon a reuseable metallic block with a thin layer of pitch or other adhesive, but lenses produced in this manner were relatively expensive in that the initial cost of reuseable blocks was high, the blanks were difficult to align on the blocks particularly after application of the adhesive, the lenses were difficult to clean after block removal, and the blocks had to be cleaned each time they were reused in order to remove adhesives collected thereon. More recently, it has been proposed to mold blocks directly on a lens blank for assuring secure mounting of the blank and for facilitating alignment of the blank and block, the selected block material having a low-melting point to be easily melted for removal and reuse after completion of the lens and preferably having a low coefficient of expansion so that the block will be accurately formed for reception in machines used in lens manufacture.

It is an object of this invention to provide a simple and inexpensive apparatus for molding a block on an article for supporting the article during manufacture. It is a further object to provide such an apparatus which can be conveniently used for molding a block in accurate location on a lens blank for supporting the blank during blank manufacture. Another object of this invention is to provide a manually-operable, portable, lens blocking apparatus which can be inexpensively supplied to optometrists and opticians for conveniently and accurately blocking a lens blank for supporting the blank during performance of finishing operations thereon. A further object of this invention is to provide a lens blocking apparatus from which a blocked lens can be conveniently removed without risk of injury to the block or lens.

Briefly described, the lens blocking apparatus provided by the invention comprises mold members which are pivotally connected for movement between open and closed mold positions, the members being cooperable in closed mold position for forming a mold cavity having an opening which extends between the members. Means disposed on the members in surrounding relation to the cavity opening are adapted to support a lens in alignment with the mold cavity opening for closing the cavity, and clamp means are provided for conveniently holding the lens upon the supporting means during molding of a block within the mold cavity.

In a preferred embodiment of this invention, the apparatus comprises a pair of elongate mold members which are pivotally connected at one end and which are adapted to be gripped at their other ends for movement between open and closed mold positions. The members are cooperable in closed mold position for forming a mold cavity having an opening which extends between the members transversely of the direction of the movement of the members and having a restricted passage, preferably having a flaring mouth, which extends between the members oppositely of the cavity opening for introducing moldable material within the cavity. A stiffly resilient rubber means is mounted upon each member adjacent the cavity opening, the rubber means being cooperable for surrounding the opening and for supporting a lens blank in alignment with the opening to close the cavity. A pivotally mounted clamp means mounted on one of the members is spring biased into engagement with the lens blank for holding the blank on the supporting means, and is preferably adapted to be gripped with the mold member upon which it is mounted for releasing lens engagement. In this construction, a lens blank can be aligned on the supporting means for closing the mold cavity opening, the apparatus preferably having proper means for facilitating said alignment, and can be conveniently clamped in position. The mold members can then be inverted and moldable material can be introduced within the mold cavity through said restricted passage. When the moldable material has properly cooled or set for forming a block which adheres to the lens blank, the clamp means are moved out of lens engagement and the mold members are separated for removing the blocked lens.

Other objects, advantages and details of construction of the apparatus provided by this invention will appear in the following description which refers to the drawings wherein:

Fig. 1 is a perspective view of a blocked lens produced by use of the apparatus of this invention;

Fig. 2 is a partial diagrammatic view illustrating the use of the lens block in performing finishing operations on the lens block;

Fig. 3 is an enlarged section view along line 3—3 of Fig. 2;

Fig. 4 is a plan view of the lens blocking apparatus of this invention;

Fig. 5 is a side elevation view of the apparatus shown in Fig. 4;

Figure 6:
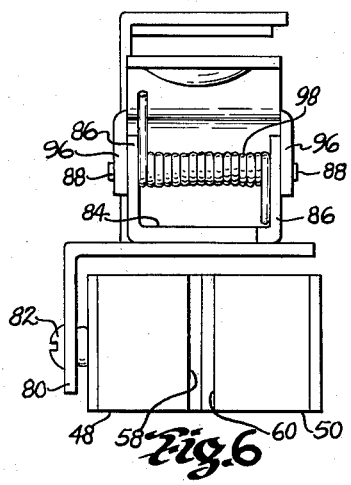
Fig. 6 is an end elevation view of the apparatus of Fig. 4.

Referring to the drawings, Fig. 1, 10 indicates a lens blank having a lens block 12 molded thereon with its axis in proper positional relation with respect to the optical center of the blank and having locating bosses formed thereon in proper alignment with one of the major meridians (not shown) of the blank for properly supporting the blank during manufacture and finishing. As illustrated, the lens blank is round and includes a convex spherical surface 14, an edge 16, and a concave spherical surface 18, but it should be understood that the apparatus provided by this invention is adapted to block a planar lens blank or any other type of lens blank whether the shape is round or otherwise.

The lens block is shown to include a tang portion 20 adapted to be received in a chuck 22 or other support on various machines during lens manufacture as shown in Fig. 3, a shoulder 24 adapted to abut the chuck to assure proper axial spacing of the block in the chuck, and bosses 26 which extend radially of the block tang for assuring proper radial alignment of the block in a chuck, but it should be understood that structural characteristics of the block have been selected for the purpose of illustration and that the blocking apparatus of this invention can be designed to provide a lens blank with a wide variety of lens block configurations.

The blocked lens blank can be supported in various machines during the process of lens manufacture, for example, the lens-edging machine 28 diagrammatically illustrated in Fig. 2 such as might be used by optometrists or opticians in preparing prescriptive lenses from lens blanks. In a lens edging machine, the lens block is received within a chuck or adapter 22 on the spindle 30 and is held therein by the bumper 32 on the spindle 34. The lens blank is engaged in the groove 36 of a rotating beveled grinding wheel 38, and the spindles 30 and 34 are simultaneously rotated for progressively advancing all portions of the lens blank edge 16 into grinding wheel engagement to provide the blank with beveled edges 40 and 42. The blocked lens blank is adapted to be moved toward and away from the grinding wheel, for determining the lens shape after edging, in response to spindle movement imparted by the former or template cam 44 which is mounted on the spindle 30 and is engaged with the contact shoe 46.

It can be seen that a lens block molded on a lens blank must be formed of a material which is sufficiently strong to withstand stresses exerted on the block during lens manufacture, that the block material must not be significantly weakened by heat which might be generated during lens manufacture, but that the block material must have a low melting point for permitting both convenient molding of the block on a lens blank and removal of the block after completion of lens manufacture. It will also be noted that the block must be accurately formed to assure proper centering of the block in a machine chuck such as the illustrated lens edging machine, and must be accurately aligned relative to the optical center and major meridians of the lens blank. The blocking material may consist of metallic alloy or a plastic adapted to provide the above characteristics, for example, the low melting point alloys commercially known as "Cerro-low" or "Cerro-bend," manufactured and sold by Cerro de Pasco Company, which liquefy at a temperature between 117° and 156° Fahrenheit and which have a very low coefficient of thermal expansion.

Figure 7:
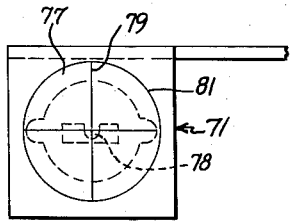
Fig. 7 is a partial plan view similar to Fig. 4 showing the lens blank aligning means.
Figure 8:
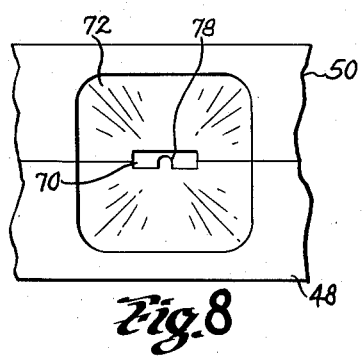
Fig. 8 is a partial bottom view of the apparatus of Fig. 4.
Figure 9:
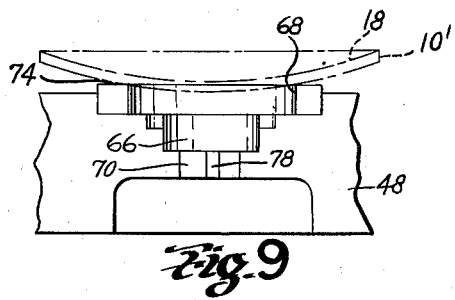
Fig. 9 is a section view along line 9—9 of Fig. 4.
Figure 10:
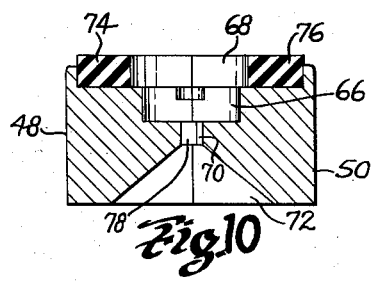
Fig. 10 is a section view along line 10—10 of Fig. 4.

According to this invention, apparatus for molding a supporting block on a lens blank may include a pair of elongate mold members 48 and 50. The member 48 is bifurcated and rounded at one end to form a pair of spaced bosses 52, and the member 50 has a single extending boss 54 at a corresponding end, the boss 54 being fitted between the bosses 52 and being pivotally connected thereto by a pivot pin 56 for permitting pivotal movement of the members between open and closed mold positions. The ends of the members 48 and 50 are reduced in size as at 58 and 60 respectively and are adapted to be gripped conveniently for pivoting the members. The mold members are recessed at 62 and 64 respectively and, when in closed mold position as shown in Fig. 4, are adapted to define a mold cavity 66 having an opening 68 which extends between the mold members transversely of the direction of pivotal movement of the members, and having a restricted passage 70, preferably substantially rectangular in cross section and having a flaring mouth 72 as shown in Figs. 7–9, which extends between the mold member oppositely of the cavity opening 68. Of course, the cavity is proportioned to form a lens block of the desired size and configuration. It should be understood that any means of detachably connecting mold members to form a mold cavity having an opening extending between the members is within the scope of this invention.

Supporting means such as split halves 74 and 76 of a stiffly resilient rubber washer are mounted on respective mold members adjacent the mold cavity opening 68 by cement or other suitable means, and are adapted, when the mold members are in closed mold position, to surround the opening for supporting a lens blank, indicated in Figs. 4–6 by dotted lines 10', in alignment with the cavity opening to close the cavity. As will be readily understood, the edges of the supporting means 74 and 76 will conform to various types of lens surfaces to form an effective seal for closing the mold cavity. Although resilient lens supporting means have been illustrated, supporting means of plastic or metal properly proportioned to form an effective seal and either mounted on or integral with the mold members are within the scope of this invention.

An aligning member 71, having a flange portion 73 mounted on the mold member 48 by means of screws 75, extends upwardly and over the mold cavity 66, and a transparent glass or plastic disc 77 having cross-hairs 79 embedded therein is superposed on an aperture 81 in the aligning member so that the intersection of the cross-hairs is aligned with the vertical axis of the mold cavity. The mold member 48 is provided with a button or blade sight 78 which extends into the restricted passage 70 and is also aligned with the vertical axis of the mold cavity. In this construction, the lens blank 10' disposed on the supporting means 74 and 76 can be aligned with the mold cavity by aligning the major meridian of the blank as marked thereon with the line of division between mold members 48 and 50 and by aligning the intersection of the cross-hairs 79 and the blade sight 78 with the optical center or other selected locating point marked on the blank. The aligning member supports the disc cross-hairs 79 at a suitable height above the mold cavity so that the lens blank 10' can be aligned relative to the lens block to be molded thereon without error such as might be caused by parallax.

A bracket 80 is secured to the mold member 48 by means of screws 82 and has a clamp member base 84 which is fixedly mounted thereon by welding or other suitable means and which extends substantially parallel to the mold member 48 and 50, the base having a pair of upstanding standards 86 which support a pivot pin 88. A clamp member lever 90, having a handle portion 92 adapted to be gripped with the mold member 48 upon which the bracket 80 is mounted and having a bifurcated end portion 94 adapted to engage a lens blank 10' disposed on the supporting means 74 and 76, has downwardly extending ears 96 which are fitted over the pivot pin 88 for permitting pivotal movement of the lever. Spring means 98 such as the illustrated coil spring is mounted on the pivot pin 88 and engages the clamp member base and lever for normally biasing the lever into lens blank engagement.

In this construction, a lens blank 10' can be disposed on the lens supporting means 74 and 76 when the mold members are in the closed mold position shown in Fig. 4 and can be aligned so that the optical center and axes of the lens blank are located with respect to the line of sight between the cross-hairs 79 and the blade 78 and with the line of division between the mold members. The lens blank can then be engaged by the clamp lever 90 for holding the lens blank in the selected position and the mold members can be inverted to place the mouth 72 of the restricted passage 70 into upwardly facing disposition. Moldable material such as one of the above described metallic alloys is then poured within the mold cavity 66 through the passage 70 and is permitted to harden or set within the cavity for assuming the shape of the cavity to form a lens block and for adhering to the lens blank 10'. Although as here illustrated, the lens block is adhered directly to the lens blank, it should be understood that the blank could be provided with a relatively thin, preferably transparent coating of plastic material such as polyvinyl chloride or the like which serves to insure better adherence of the block to the lens blank, but which can be conveniently peeled from the lens after removal of the block. When the molded material has hardened sufficiently to form the lens block, the handle 92 of the clamp lever 90 can be gripped with the end 58 of the mold member 48 for releasing the clamp lever from lens engagement and thereafter the mold members can be pivoted to open mold position for releasing the blocked lens blank. The blocked lens blank can then be mounted in a machine such as the lens edging machine above described.

It can be seen that the lens blocking apparatus provided by this invention is simple and inexpensive to manufacture and use and can accurately locate and form a lens block upon a lens blank. It can also be seen that location of the lens blank clamping means to be gripped at the same time as the mold member 48 permits convenient blocking of the lens by a single operator. Further, pivotal movement of the mold members to open mold position permits removal of the blocked lens without risk of injury to the lens or block, such as might be caused if the lens block had to be withdrawn from a more substantially enclosed mold cavity.

Although a particular embodiment of this invention has been described for the purpose of illustration, it should be understood that this invention includes all modifications and equivalents thereof which fall within the scope of the appended claims.

I claim:

1. Lens blocking apparatus comprising mold members pivotally connected for movement between open and closed mold positions, said members being cooperable in closed mold position for forming a mold cavity having an opening which extends between the members, means mounted on the members for supporting a lens blank in alignment with said cavity opening to close the cavity, and clamp means mounted on the members and adapted releasably to hold the lens blank upon said supporting means, whereby a lens block can be molded on said lens blank and the mold members can thereafter be moved to open mold position for releasing the blocked lens blank.

2. Lens blocking apparatus comprising a pair of mold memebrs pivotally connected for movement between open and closed mold positions, said members being cooperable in closed mold position for forming a mold cavity having an opening which extends between the members, at least one of said members having a restricted passage for introducing moldable material within the mold cavity, resilient means mounted on the members for supporting a lens blank in alignment with said cavity opening to close said opening, and clamp means mounted on one of said members and adapted to hold the lens blank upon said supporting means, whereby a lens block can be molded on said lens blank and the mold members can thereafter be moved to open mold position for releasing the blocked lens blank.

3. Lens blocking apparatus comprising a pair of mold members pivotally connected for movement between open and closed mold positions, said members being cooperable in closed mold position for forming a mold cavity having an opening which extends between the members and having a restricted passage which extends between the member oppositely of said opening for introducing moldable material within the cavity, said members having aligning means thereon adjacent said cavity opening, means mounted on the members for supporting a lens blank which is located relative to said aligning means to close said opening, and clamp means mounted on one of the members and adapted releasably to hold the lens blank on said supporting means.

4. Portable lens blocking apparatus comprising a pair of elongate mold members pivotally connected at one end and adapted to be gripped at their other ends for movement between open and closed mold positions, said members being cooperable in closed mold position for forming a mold cavity having an opening which extends between the members transversely of the direction of movement of said members, means mounted on the members for supporting a lens blank in alignment with said opening to close the cavity, a clamp lever pivotally mounted intermediate its ends on one of said members and having one end adapted to engage said lens blank, and spring means normally biasing the lever into lens engagement for holding the lens blank upon said supporting means.

5. Lens blocking apparatus comprising a pair of elongate mold members pivotally connected at one end and adapted to be gripped at their other ends for movement between open and closed mold positions, said members being cooperable in closed mold position for forming a mold cavity having an opening which extends between the members transversely of the direction of movement of the members and having a restricted passage extending oppositely of said opening for introducing moldable material into the cavity, said passage having a flaring mouth for receiving said material, stiffly resilient rubber means mounted on each member adjacent said cavity opening, said rubber means being cooperable for surrounding said opening and for supporting a lens blank in alignment with the opening to close the cavity, a clamp member pivotally mounted intermediate its ends on one of said mold members, said clamp member having one end adapted to engage said lens blank and having its other end adapted to be gripped with the mold member upon which it is mounted for releasing lens blank engagement, and spring means normally biasing the clamp means into lens blank engagement for holding the lens blank upon said supporting means.

6. Lens blocking apparatus comprising mold members adapted for movement between open and closed mold positions, said members being connected in closed mold position for forming a mold cavity having an opening which extends between the members, means mounted in the members for supporting a lens blank in alignment with said cavity opening to close the cavity, and clamp means mounted on the members and adapted releasably to hold the lens blank upon said supporting means, whereby a lens block can be molded on said lens blank and the mold members can thereafter be moved to open mold position for releasing the blocked lens blank.

References Cited in the file of this patent

UNITED STATES PATENTS

| | | |
|---|---|---|
| 1,191,905 | Maynard | July 18, 1916 |
| 1,433,818 | Hill | Oct. 31, 1922 |
| 2,683,342 | Dalton | July 13, 1954 |